…

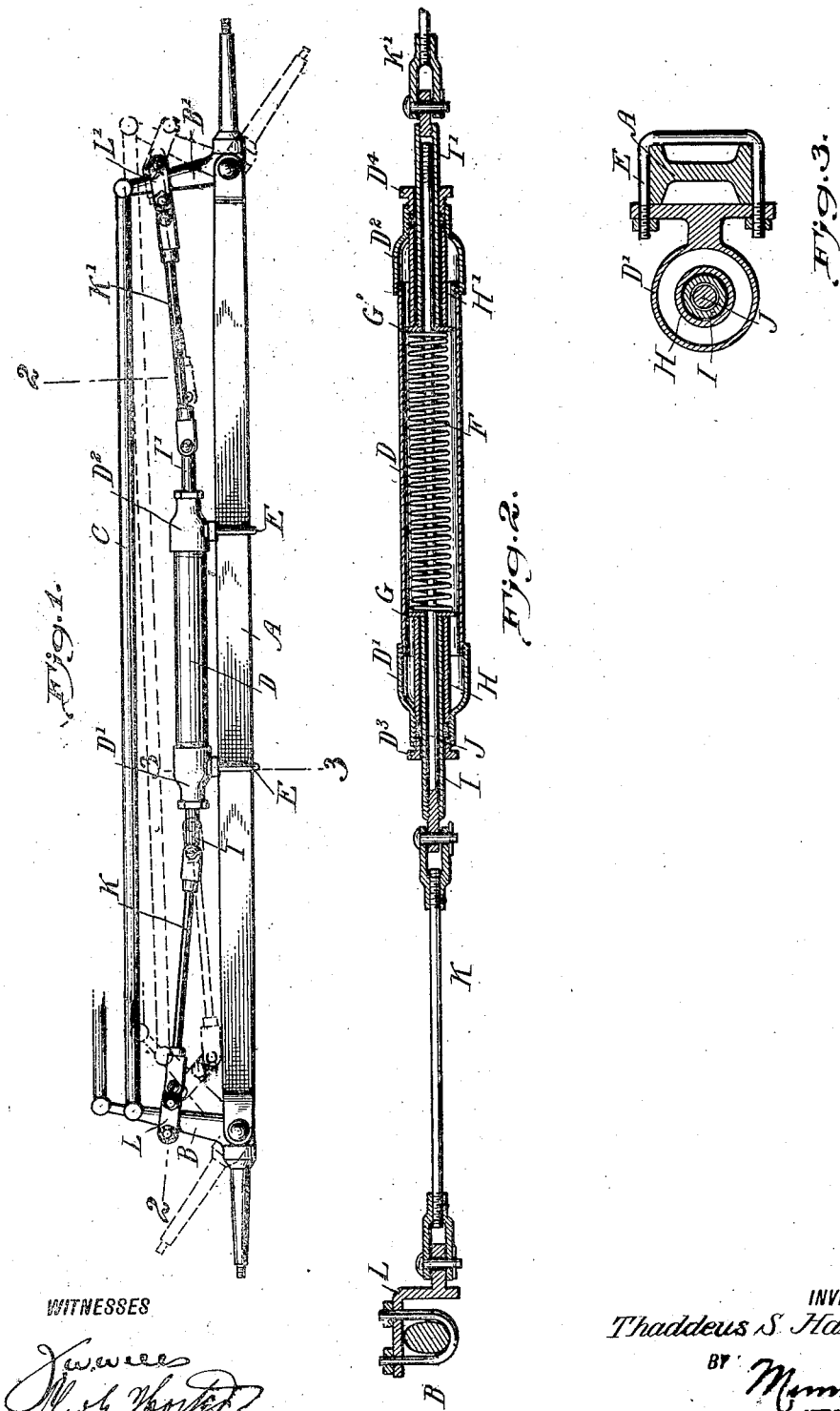

UNITED STATES PATENT OFFICE.

THADDEUS S. HARRIS, OF WAVERLY, ILLINOIS.

VEHICLE STEERING DEVICE.

1,119,014.

Specification of Letters Patent.

Patented Dec. 1, 1914.

Application filed October 20, 1913. Serial No. 796,198.

*To all whom it may concern:*

Be it known that I, THADDEUS S. HARRIS, a citizen of the United States, and a resident of Waverly, in the county of Morgan and State of Illinois, have invented a new and Improved Vehicle Steering Device, of which the following is a full, clear, and exact description.

The invention relates to vehicle steering devices such as shown and described in the Letters Patent of the United States, No. 1,084,430, granted to me January 13, 1914.

The invention relates to automobiles and other power-driven vehicles, and its object is to provide a new and improved vehicle steering device arranged to allow convenient steering of the vehicle to the right or to the left, to return the parts with or without the aid of the driver to normal position, that is with the front or steering wheels parallel with the longitudinal axis of the vehicle, and to hold the vehicle normally in a straight course even on rough roads and thus relieve the driver of undue strain.

In order to accomplish the desired result use is made of a spring device held on the axle and a connection at both ends of the spring device and one or both of the steering knuckles of the automobile to return the knuckles to normal position after being swung out of normal position to the right or to the left.

A practical embodiment of the invention is represented in the accompanying drawings forming a part of this specification, in which similar characters of reference indicate corresponding parts in all the views.

Figure 1 is a plan view of the steering device; Fig. 2 is an enlarged vertical section of the same on the line 2—2 of Fig. 1; and Fig. 3 is an enlarged cross section of the same on the line 3—3 of Fig. 1.

On the ends of the axle A are pivoted the steering knuckles B, B' connected with each other by the rod C so that the knuckles B, B' move in unison either to the right or to the left when actuated by the driver manipulating the steering wheel connected by the usual mechanism with the knuckle B, as indicated in Fig. 1. A casing D, preferably of tubular shape, is provided with end caps D', D² fastened by suitable clips E to the axle A, as plainly indicated in Fig. 1, and within the said casing D is arranged a coil spring F resting with its ends on washers G, G' abutting against the inner ends of tubes H, H' screwed or otherwise secured in the caps D', D². By the arrangement described the spring F is normally held under a light tension. The outer ends of the caps D', D² of the casing D are provided with stuffing boxes D³, D⁴ in which slide sleeves I and I' extending within the tubes H, H' and normally abutting against the washers G, G'. In the sleeve I is secured a rod J which extends through the sleeve I, the spring F, washers G, G' and slidingly engages the sleeve I', and the outer end of the rod J is pivotally connected by a link K with a clip L attached to the knuckle B, as plainly shown in Figs. 1 and 2. The outer end of the sleeve I' is pivotally connected by a link K' with a clip L' secured to the knuckle B'. It will be noticed that by the arrangement described the spring F is compressed on swinging the knuckles B, B' either to the right or to the left, so that when the driver releases the steering wheel the spring F exerts its power and returns the several parts to normal position.

It is understood that when the knuckles B, B' are swung, for instance, from the normal position shown in Fig. 1 to the right, as indicated in dotted lines in Fig. 1 then the link K pushes the sleeve I to the right to compress the spring F from the left to the right against the washer G' held resting against the fixed tube H'. At the same time the sleeve I' slides to the right owing to its connection by the link K' with the knuckle B'. In case the knuckles B and B' are swung from normal position, as shown in Fig. 1, to the left then the link K' pushes the sleeve I' to the left and in doing so the spring F is compressed from the right to the left against the washer G resting on the fixed tube H.

From the foregoing it will be seen that the spring F is compressed from either end according to the direction in which the connected knuckles B, B' are swung for steering the automobile either to the right or to the left, and when a straight road is reached and the driver releases the steering device then the latter returns to normal position owing to the action of the compressed spring F as before explained.

Having thus described my invention, I claim as new and desire to secure by Letters Patent:

1. A vehicle steering device, comprising an axle, steering knuckles pivoted on the said axle, a steering rod connecting the said steering knuckles with each other, a casing attached to the said axle, a spring within the said casing, compressing means engaging both ends of the spring for compressing the said spring in either direction, and a link connecting each of said compressing means with a steering knuckle.

2. A vehicle steering device, comprising an axle having pivoted steering knuckles, a casing attached to the axle, a spring within the casing, sleeves in the casing and abutting against the ends of the spring, and a link connecting each sleeve with a knuckle.

3. A vehicle steering device, comprising an axle, connecting steering knuckles pivoted on the said axle, a casing attached to the axle, a spring within the said casing, sleeves slidable in the said casing and abutting against the ends of the said spring, a rod attached to one of the said sleeves, a link connecting the rod with one of the steering knuckles, and a link connecting the other sleeve with the other knuckle.

4. A vehicle steering device, comprising an axle, connected steering knuckles pivoted on the said axle, a casing held on the said axle, a spring within the said casing, sleeves slidable in the ends of the said casing and engaging the ends of the said spring, a link connecting one of the sleeves with one of the said knuckles, a rod secured to one sleeve and extending through the spring into the other sleeve, and a link connecting the rod with the other knuckle and tubes held in the ends of the said casing and through which extend the said sleeves, the ends of the said spring resting on the inner ends of the said tubes.

In testimony whereof I have signed my name to this specification in the presence of two subscribing witnesses.

THADDEUS S. HARRIS.

Witnesses:
 MILES R. BRYAN,
 CLIFFORD R. HARMON.